United States Patent Office.

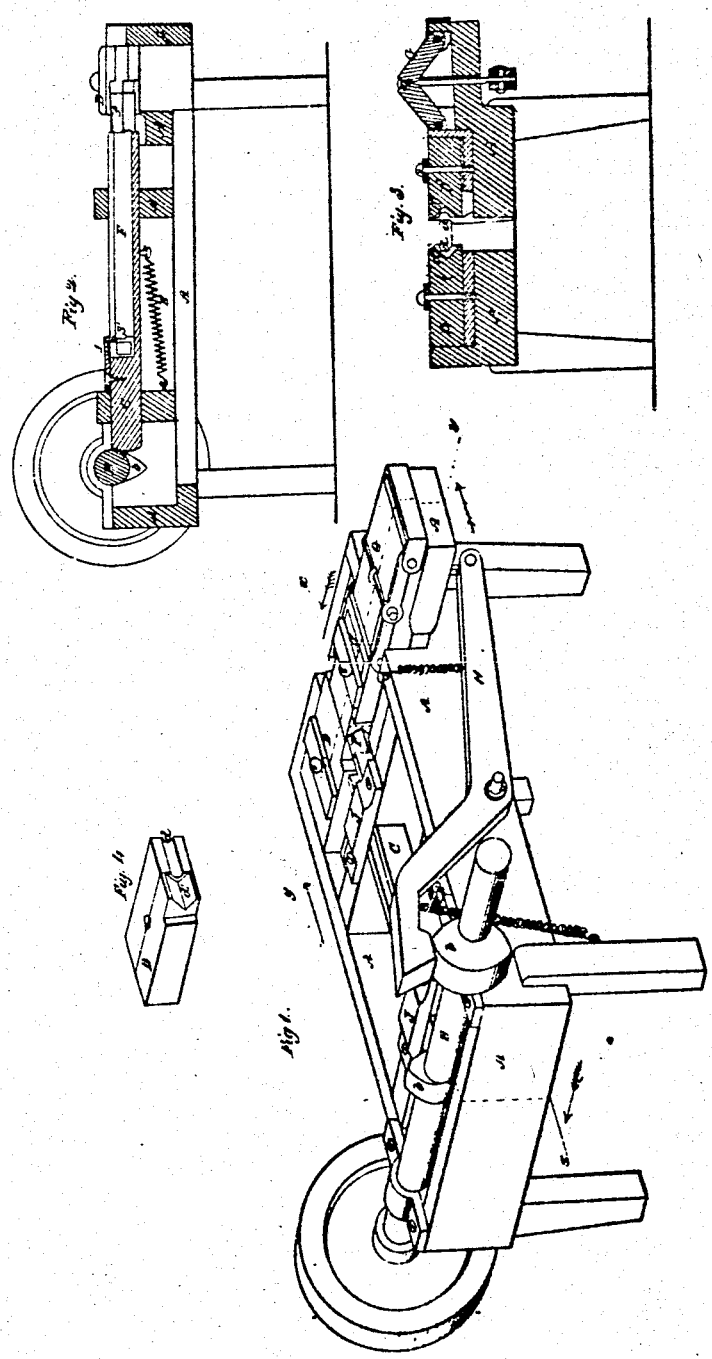

PHILIP P. TRAYSER, OF BALTIMORE, MARYLAND, ASSIGNOR TO HIMSELF AND RICHARD W. TYSON, OF SAME PLACE.

*Letters Patent No. 61,896, dated February 5, 1867.*

IMPROVED BOLT-HEADING MACHINE.

*The Schedule referred to in these Letters Patent and making part of the same.*

TO ALL WHOM IT MAY CONCERN:

Be it known that I, PHILIP P. TRAYSER, of the city and county of Baltimore, in the State of Maryland, have invented a new and useful Improvement in Machines for Heading Bolts; and I do hereby declare the following to be a full, clear, and exact description of the nature, construction, and operation of the same, reference being had to the accompanying drawings, which are made a part of this specification, and in which—

Figure 1 is a perspective view of a bolt-heading machine embodying my invention.

Figure 2 is a longitudinal vertical section of the same, the plane of section being indicated by the line $x\,x$, fig. 1.

Figure 3 is a transverse section of the same on the line $y\,y$, fig. 1.

Figure 4 is a perspective view of one of the jaws which form the die.

Similar letters of reference indicate corresponding parts in the several figures.

This invention relates to the machines in which the bolt-head is produced by forcing a male die or heading tool into a suitable matrix and against the end of the bolt-blank, which is clamped between the two jaws in which the matrix is formed.

My improvement consists in a novel method of applying the heading tool, whereby the square head of the same is adapted to readily adjust itself within the square matrix of the die, which insures a more perfect formation of the bolt-head and prevents the damage which results from the heading tool working unevenly or out of true within the matrix.

The following description will enable others skilled in the art to which my invention appertains to fully understand and use the same.

In the accompanying drawings, A represents the frame which supports the several operating devices. B is the driving-shaft, to which power may be applied to give it a rotary motion for the purpose of advancing the hollow tool-carrier C toward the jaws D D', which form the die in which the bolt-head is struck up. The tool-carrier C works through guides, J J. $b$ is a cam or tappet on the shaft B, acting against the extremity of the tool-carrier C to give the latter its effective impulse, the return motion of the tool-carrier being effected by the spring E. F is the tool, the head $f$ of which operates within the enlarged cavity or matrix in the dies wherein the bolt-head is formed. The movable jaw D' of the dies is connected by a hinge, G, with a lever, H, which is vibrated by a cam, $b'$, on the shaft B, and serves to alternately advance the jaw D' against and retract it from the jaw D, as the bolts are successively introduced and removed from the die. No further description of the devices for operating the movable jaw of the die is needed, as they form no part of the present invention. The contiguous faces of the jaws D D' are formed with recesses or cavities, $d\,d'$, (see fig. 4,) which, when brought together, constitute a mould or die, corresponding in shape to the bolt or spike which is to be produced. When the blank is introduced it is clamped firmly within the smaller part $d\,d$ of the die, and the end which is to form the bolt-head projects into the enlarged square part of the matrix $d'\,d'$. The heading tool F is placed loosely within the hollow tool-carrier C, but retained therein by means of the hook or bent arm I; the extremity of which occupies a circular groove $f'$ in the shank of the tool F. By thus securing the tool F within the tool-carrier C, the former is held against vertical or longitudinal displacement, and at the same time permitted to have a slight lateral and turning movement within the tool-carrier. Hence, when the head $f$ is advanced in the die and against the bolt-head, it is free to adjust itself so as to move freely and smoothly without friction or binding. In this way the die is preserved against abrasion from the heading tool, and the latter acts with much better effect in striking up the bolt head. In operation, the head of the tool F is never withdrawn entirely from the heading matrix of the die D D'. The die is represented as formed in two parts, which permit either the clamping or heading part to be adjusted independently to compensate for wear.

Having thus described my invention, the following is what I claim as new, and desire to secure by Letters Patent:

I claim the heading tool F, working within the die D D', and so secured within the tool-carrier as to be capable of adjusting itself within the die, substantially as and for the purpose herein set forth.

PHILIP P. TRAYSER.

Witnesses:
WM. GILMOR,
WALTER D. HISS.